United States Patent [19]

Hurley et al.

[11] 4,271,666
[45] Jun. 9, 1981

[54] INTEGRAL INFRARED RADIATION SUPPRESSOR FOR A TURBOFAN ENGINE

[75] Inventors: John F. Hurley, Easton; Paul L. Hoffman, Stratford, both of Conn.

[73] Assignee: Avco Corporation, Stratford, Conn.

[21] Appl. No.: 68,304

[22] Filed: Aug. 20, 1979

[51] Int. Cl.³ .............................................. F02K 3/04
[52] U.S. Cl. .................................. 60/226 R; 60/262; 60/266; 60/722; 415/116
[58] Field of Search ............. 60/262, 722, 266, 226 R; 415/115, 116, 117

[56] References Cited

U.S. PATENT DOCUMENTS

| | | | |
|---|---|---|---|
| 2,445,661 | 7/1948 | Constant | 415/116 |
| 2,639,579 | 5/1953 | Willgoos | 60/266 |
| 2,826,895 | 3/1958 | English | 60/266 |
| 3,742,705 | 7/1973 | Sifford | 415/117 |
| 3,970,252 | 7/1976 | Smale | 60/266 |
| 4,136,518 | 1/1979 | Hurley | 60/266 |
| 4,163,366 | 8/1979 | Kent | 60/226 R |

FOREIGN PATENT DOCUMENTS 768041  5/1955  Fed. Rep. of Germany ............ 60/262

Primary Examiner—Douglas Hart
Attorney, Agent, or Firm—Ralph D. Gelling

[57] ABSTRACT

Apparatus is disclosed for minimizing the infrared radiation emitted at the aft end of a bypass fan type turbine engine. Minimization is accomplished by ducting cool air from the secondary bypass airstream through an annulus to form a sheath of cooler air around the gas stream as it is discharged from the engine tailpipe. The sheath of air educted along the inside surface of the engine tailpipe minimizes infrared radiation in two ways. First it reduces the operating temperature of the tailpipe thus keeping radiation therefrom to a low level. Second, the cool outside air becomes entrained in the hot gas stream discharged from the turbine. This results in a reduction of the effective temperature of the gas plume and suppresses infrared radiation therefrom.

4 Claims, 4 Drawing Figures

INTEGRAL INFRARED RADIATION SUPPRESSOR FOR A TURBOFAN ENGINE

BACKGROUND OF THE INVENTION

Aircraft powered by gas turbine engines radiate a large amount of infrared energy. The radiation is emitted both from the exposed hot metal engine parts and from the hot exhaust gas plumes. The radiated infrared energy makes a military aircraft vulnerable to a heat seeking missile. Much has been done by both the airframe and engine manufacturers in recent years to try to combat this vulnerability. The U.S. Pat. No. 4,007,587 to Banthin et al shows one approach used to suppress the infrared radiation from a gas turbine engine. In Banthin et al a vane assembly is attached to the tailpipe of a gas turbine engine used for driving the rotor of a helicopter. The vane assembly provides for the introduction of cooling air which serves to both dilute and cool the hot gas exhaust from the engine. At the same time, the vane assembly serves to shield from view the hot metal parts at the aft end of the turbine engine.

Numerous other infrared radiation suppressors have been tried. Many of these require the use of large air pumps or in some way necessitate a substantial engine power loss when operating. Our invention overcomes these deficiencies, providing a simple and efficient suppressor that can be easily incorporated into a bypass turbine engine.

SUMMARY OF THE INVENTION

The main object of the invention is to provide means for reducing the infrared radiation emitted from the tailpipe section of a gas turbine engine. In particular, the forward fan high-bypass engine typifies a class of gas turbine wherein the invention is very effective in suppressing infrared radiation.

The high-bypass engine incorporates a turboshaft core engine to provide the power to drive the fan. Extending forward from the core engine is the shaft which, through reduction gearing, drives a large diameter ducted fan. The fan rotates in an annular duct which has an intake for receiving atmospheric air. The airstream accelerated by the fan is divided. One part of the airstream (primary air) is fed to the core engine. The other part of the airstream (secondary air) bypasses the core engine through an annular duct which surrounds the core engine. In the turbofan engine in which our invention was embodied this portion of the airstream is ejected directly as a "non-mixed" exhaust.

The secondary airstream which bypasses the core engine unit must flow in a well-streamlined smooth duct to minimize aerodynamic losses. Thus, the inner wall of the annular fan duct is a smooth-surfaced cowl which encircles the core engine. This cowl not only serves to cover any irregularly shaped bulges resulting from core engine parts placement but also serves to control the velocity interface between the bypass airstream and the core engine exhaust gas.

Bypass fan air can be conveniently ducted through the inner wall of the duct and into the space immediately surrounding the core engine. Fan air is inducted through a multiplicity of openings in the cowl. The dynamic pressure in the secondary airstream forces air into the cavity between the cowl and the core engine. This ventilating air flows axially aft over the core engine and discharges as an annular sheath along the inner surface of the engine tailpipe. In order to permit the ventilating air to flow from the cavity around the core engine, an annular eductor slot is provided between the outer surface of the containment ring surrounding the aftmost turbine stage and an exhaust casing of slightly larger diameter positioned at the front of the tailpipe.

This annular shaped eductor slot causes a flow of air from the secondary airstream channel that is enhanced by the lower ambient pressure present at the tips of the aftmost turbine blades. The result is a sheath of ambient cooling air flowing along the interior surface of the engine tailpipe section during normal flight operations. The ambient air flow keeps the tailpipe temperatures well below what would have been attained without incorporation of our invention. Additionally, the admixture of ambient air into the hot gas plume coming out of the engine tailpipe also serves to reduce infrared radiation therefrom. The amount of the reduction in radiation follows the Stefan-Boltzmann law which states that the total power radiated by a blackbody is proportional to the fourth power of the temperature measured in degrees Kelvin. In actual terms this would mean that the total blackbody radiation is reduced by 55 percent when the plume temperature is reduced from 550° C. to 400° C.

Film cooling the interior surface of the tailpipe drastically reduces the temperature of all metal parts making up the engine exhaust system. This includes the tailpipe, the fire shield surrounding the tailpipe and the supporting struts. By arranging to have 10-15 percent of the secondary air flow through the eductor slots, the temperature of the metal parts at the exhaust end of the engine is significantly reduced. The result is a major reduction in infrared radiation.

There are other benefits which result from the ducting of bypass fan air through the inner wall of the cowl duct and into the space surrounding the core engine. The ejected flow will also keep the aft turbine containment ring cooler and improve the strength characteristics of the material. Weight can be reduced on the containment ring with this invention due to the cooler surfaces. Operational safety of the engine will also be enhanced. Danger from combustion of flammable liquids on these typically hot areas will be minimized. The invention further allows enough air (10-15% of engine flow) to be educted to be useful as a compartment ventilation system. Typically, this is a problem all airframe manufacturers must address. With this system, ventilation means are included as an integral part of the engine.

Running turbine tip clearance of the aft turbine can also be improved using the shroud cooling aspects of the eductor. During engine acceleration and deceleration, the physical response of the shroud as well as its distortion will be more controlled, enabling tighter running clearances and greater power turbine efficiencies.

DESCRIPTION OF THE ILLUSTRATED EMBODIMENT

Figure 1:
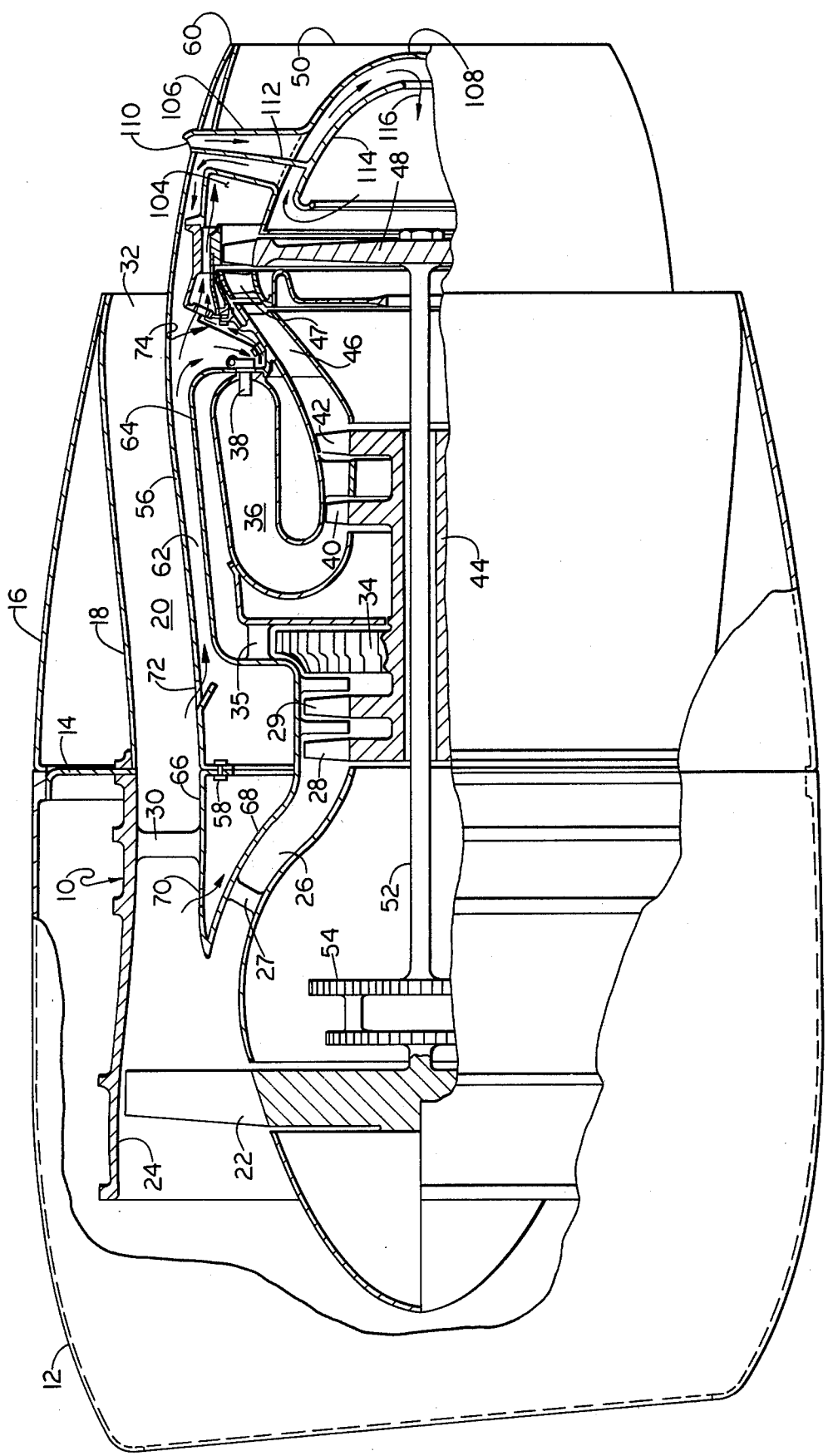
FIG. 1 is a cross-sectional view of a turbofan engine with partial cutaways showing the gas producer section surrounded by an air eductor which injects a sheath of cooling air around the exhaust gas plume.

A turbofan engine 10 is shown in FIG. 1. Turbofan engine 10 is shown coaxially arranged in nacelle 12. An aircraft will usually have at least two such engines mounted thereon for propulsion. Bracket 14 connects engine 10 to nacelle 12. Aft portions 16 and 18 of nacelle 12 serve respectively as an outer fairing and as the outer wall of bypass air duct 20.

Turbofan engine 10 (See cutaway portion of FIG. 1) is typical of high bypass ratio units having a single front mounted ducted fan stage 22. Fan stage 22 rotates in annular duct 24 which is a continuation of the air intake. The stream of air accelerated by fan stage 22 is divided. "Primary" air enters passageway 26 passing around fixed guide vanes 27 and flowing on into compressor stages 28 and 29. "Secondary" air passes over fixed guide vanes 30, through annular bypass duct 20 and eventually discharges at nozzle 32 as a cold gas stream.

In the FIG. 1 arrangement, fan stage 22 supercharges compressor stages 28 and 29. Air from compressor stage 29 is forced radially outward by impeller blades 34 so as to pass through diffuser 35. High pressure air from diffuser 35 flows through orifices into combustor 36. Fuel enters combustor 36 through nozzles 38. The hot gases from the combustor drive turbine blade stages 40 and 42. Power absorbed from the hot gas stream by turbine stages 40 and 42 is used to drive the compressor stages via tubular shaft 44.

Hot gases leaving turbine stage 42 pass through fixed guide vanes 46, nozzle 47 and then continue on into turbine stage 48. Power absorbed by turbine stage 48 serves to drive input fan stage 22 via shaft 52 and reduction gearing 54. Hot gases leaving turbine stage 48, and exiting at tailpipe 50, provide a smaller portion of overall engine thrust compared to cold air discharging at nozzle 32.

Surrounding the core engine is a generally cylindrical cowl 56 which serves as the inner wall of fan air duct 20. Cowl 56 is held axially symmetric with the core engine by means of bolts 58 and contact 60 at the end of tailpipe 50. The cross-sectional diameter of cowl 56 is such that an annular shaped cavity 62 is formed between the inside of cowl 56 and outer wall 64 of the core engine.

Cylindrical wall 56 is joined by bolts 58 to the extending cowl end 66 of the engine frame 68. A multiplicity of holes 70 are distributed around the forwardmost portion of cowl end 66. Holes 70 admit air from fan duct 20 to the forward portion of the bay between the core engine and the inner wall of fan duct 20. A second series of holes 72 serve as air inlet ports to the annular space 62 between the core engine outer wall 64 and the interior side of cowl wall 56. Holes 70 and 72 were sized and spaced in the unit reduced to practice so as to siphon off between 10 and 15 percent of the contents of fan duct 20 during operating conditions.

Figure 3:
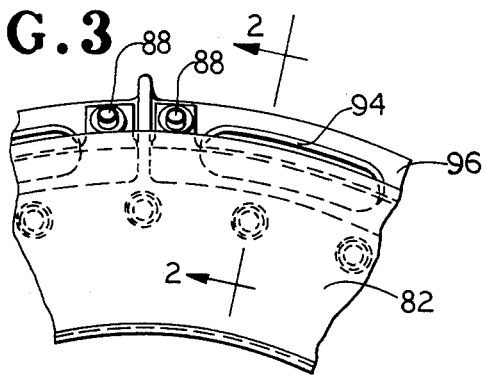
FIG. 3 is a partial view taken along line 3—3 of FIG. 2.
Figure 4:
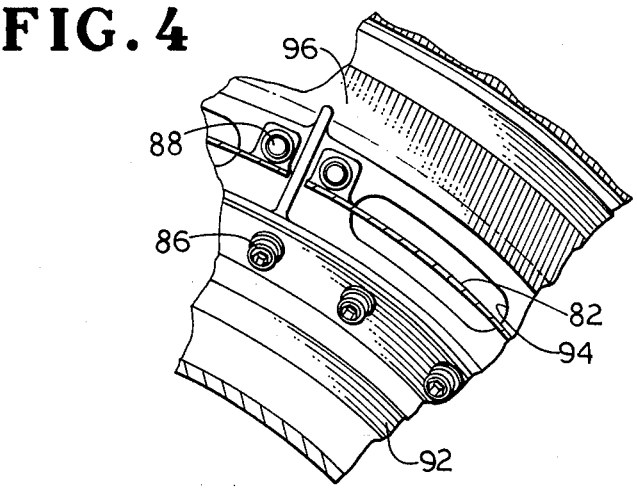
FIG. 4 is a partial view taken along line 4—4 of FIG. 2.

The air flowing aft under cowl 56 passes the end of combustor 36. Beyond combustor 36 the airstream encounters eductor 74. The details of the eductor are better seen in FIG. 2. There it can be seen that aft flowing airstream 76 divides into two parts 78 and 80. Cooling air fraction 78 flows down around the end of core engine outer wall 64, passing between fire shield 82 and fuel line fittings 84. Fire shield 82 is as two halves of a conical section, each of which is secured in place by a multiplicity of bolts 86 and 88 (See FIGS. 2, 3 and 4).

Cooling air fraction 78 passes around the inlet end of fire shield 82, flowing then along the cavity 90 which lies between fire shield 82 and the outer casing wall 92 of the core engine. The air in cavity 90 picks up heat from outer casing wall 92 and then exits the cavity via a multiplicity of air slots 94.

Air slots 94 (See FIGS. 2, 3 and 4) are positioned around exhaust support casing 96 such that all of the aft flowing airstream passes therethrough. Cooling air fraction 80 passes directly through the outer half of air slot 94. Cooling air fraction 78 flows through the innermost half of slots 94 after passing through the cavity formed by fire shield 82. The combined fractions of the airstream then flow along annular cavity 98 contained between exhaust support casing 96 and the periphery of turbine wheel shroud 100.

The exhaust gases leaving power turbine stage 48 are traveling at high velocity as they exit rotor blades 102. This means that immediately downstream of shroud 100 there is a jet air pumping action induced on the contents of annular cavity 98. In the FIG. 1, FIG. 2 configuration, the trailing edge of shroud 100 performs the same function as the ejector nozzle section of an air jet pump. Air entering at inlets 70–72 is drawn through annular cavity 98 by this air jet pumping action.

Downstream of shroud 100, as in a conventional jet pump, is a mixing tube region 104. Here the relatively cool air from annular cavity 98 is entrained in the hot exhaust gases coming from the combustor section of the core engine. Due to the inflow of relatively cool air, the surrounding tailpipe section 105 (See FIG. 2) does not become anywhere near as hot as would be the case in a prior art engine. The mixing tube region 104 is followed by an annular exhaust diffuser section located in the region of radial struts 106. The annular diffuser serves to slow the combined exhaust gas and cooling air while at the same time causing the gas to undergo a pressure rise which helps propel the aircraft as it reaches exit 50. The exit gas plume has an appreciably lower temperature due to the mixing in of cooling air from the bypass airstream than would be the case for exhaust gas temperatures measured at rotor blades 102.

Use of hollow configuration struts 106 provides additional cooling of aft engine parts. As can be seen in FIG. 1, each strut 106 is not only hollow but is divided into two parts by a lengthwise extending web 112. The outward extending end of the strut is then attached to a forward facing scoop 110 which picks up air from the bypass airstream. The air thus picked up is passed by the struts into the interior of rear pressure equalizing cone 108. Deflector 114 assures that the inducted air from scoops 110 passes along the interior face of tail cone 108. Once past deflector 114, the inducted cool air flows forward as shown by arrow 116, exiting around the forward end of deflector 114 and outward through the forward facing half of struts 110. The inducted airstream then flows forward within cowl 56 until it reaches air slots 94 of eductor 74 (See FIG. 2).

Radial struts 106 thus perform not only a diffuser function but also, by being hollow, allow cool air from the bypass airstream to be inducted to further cool the walls of all rear facing core engine components. Suppression of infrared radiation is thus achieved in the engine utilizing our invention due both to a reduction in the temperature of the metal parts making up the tail section of the engine and in reducing the plume temperature of the engine exhaust.

In addition to suppressing infrared radiation, our invention also achieves another useful function. The combined air entering inlets 70 and 72 sweeps out any flammable vapors which tend to collect within cowl 56 (See FIG. 1). There is thus no ignition of any flammable liquids which might drip on hot engine surfaces. The airstream which flows between cowl 56 and outer wall 64 of the core engine is split into two fractions by fire shield 82 (See FIG. 2). For air to get underneath fire shield 82, it has to pass the ends of combustors 36 which contain the fuel nozzles 38. Most fuel leakage will occur in the fittings which connect fuel lines to the combustors 36. It will be understood that there are a multiplicity of fuel line fittings 84 and fuel nozzles 38 around the circumference of the core engine. Due to the large number of pipe joints and fuel line fittings in the area of nozzles 38, leakage of fluids will most likely occur in the compartment surrounding the junction between outer wall 64 and the fuel line distribution system represented in FIG. 2 by fitting 84.

Ventilation is used to purge out and repress ignition of flammable fluids and vapor which might leak into the above mentioned compartment surrounding fittings 84. Additionally, shield 82 is employed around the hottest engine casings to provide lowered surface temperatures through the flushing action of the cooling air over the outside of surface 92. The placement of the fire shield 82 and air slots 94 just aft of the area containing the fuel causes a certain amount of turbulence in the region. The turbulent air conditions bring about more rapid vaporization of any leakage fluids present.

The vaporized leakage fluid particles entrained in the ventilating air exits through annular cavity 98. Gases emitted into mixing tube region 104 become hot enough to cause the vaporized leakage fluid particles either to become oxidized or to undergo a chemical dissociation so that the hydrocarbons are broken down into carbon particles and aromatics. In any case, our invention prevents the ignition of flammable liquids within the confines of the cavity surrounding the combustor casing of the core engine.

Figure 2:
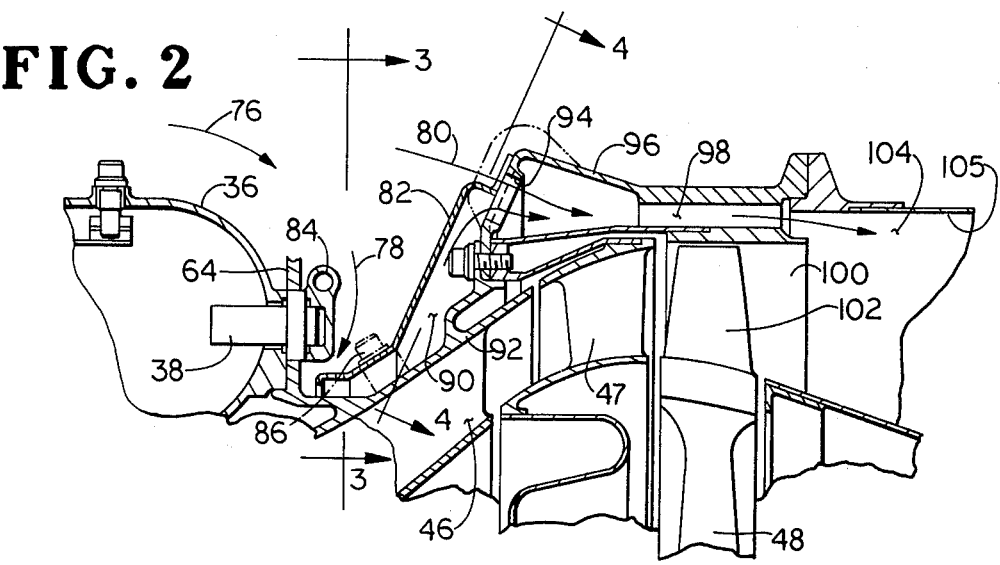
FIG. 2 is a partial cross-sectional view of the integral air eductor in the vicinity of the power turbine rotor.

A further advantage which accrues to the use of our invention concerns the cooling of engine components. As seen in FIG. 2, there is a turbine wheel shroud 100 which surrounds rotor blades 102. Passage of cool air through annular cavity 98 film cools turbine wheel shroud 100. A cooled shroud has improved material strength. Thus, to achieve a given strength under operating conditions, less material can be used, thereby saving weight. By reducing the temperature swing between cold and operating conditions there is also less expansion of the shroud and tip clearance between the turbine blades and the shroud can be controlled to closer tolerances.

Although a preferred embodiment of the invention has been described in detail, it is to be understood that various changes, substitutions and alterations can be made without departing from the spirit and scope of the invention. For example, inlets 72 have been shown as having a negative directed ramp. In implementing this invention on some engines it may be required to obtain a higher pressure at the ventilation inlets to produce an adequate flow of air. Forward facing scoops may then be required to direct an adequate quantity of air into the interior of the engine cowl. Also, implementation has been shown with respect to a turbofan engine having a bypass or secondary airstream from which to obtain the supply of cooling air. For turbine engines not having a bypass airstream, the cooling air could be brought in via forward pointing airscoops which gathered in air as it streamed past the engine nacelle. All such changes are considered to be within the scope of the invention.

Further, the preferred embodiment has been shown as having a tailpipe with an inlet diameter which is greater than that of the trailing edge of the final turbine shroud. This arrangement forms an annulus between the shroud and the tailpipe which provides an airjet pumping action. Other means for providing a flow of ambient cooling air into the exhaust plume adjacent the interior surface of the tailpipe may be implemented without departing from the scope of this invention. For example, a series of air slots adjacent the upstream edge of the tailpipe would allow the influx of ambient cooling air into the hot gas of the exhaust. The scope of our invention includes the introduction of a sheath of cooling air along the interior surface of the tailpipe both to hold down the temperature of the aft structure of the engine and at the same time to lower the plume temperature by entraining cool ambient air within the hot exhaust gas.

We claim:

1. In a gas turbine engine having compressor, combustor, turbine and tailpipe stages arranged to sequentially receive the primary airflow of the engine, means to reduce the infrared radiation of the tailpipe and exhaust of said engine comprising:

a generally cylindrical housing constructed to support and enclose the gas tubine engine, said housing having a closed inner cavity surrounding at least the turbine components of the engine but isolated from the primary airflow:

means communicating with the closed cavity of the housing to allow air to enter said cavity;

a fire shield mounted in the inner cavity of the housing to divide the airflow therein and direct a portion of said airflow toward the hotter portions of said housing to increase the cooling provided thereby; and a containment shroud mounted in the housing to enclose the power turbine rotor of the engine and isolate the main fluid flow from the cavity, said shroud being constructed with a passage extending between the housing cavity and the exhaust tailpipe section of the housing immediate downstream of said turbine to form an eductor to draw cooling air into the exhaust from the housing cavity.

2. The invention as defined in claim 1 wherein the cooling air drawn past said shroud provides film cooling thereof serving thereby to reduce the temperature swing between cold and operating conditions whereby the clearance between said shroud and said turbine rotor is controlled.

3. The invention as defined in claim 1 wherein the gas turbine engine is of the bypass fan type and includes a driven fan for generating both a primary and a secondary airstream, said secondary airstream flowing in a streamlined smooth duct, the inner wall of said smooth duct serving as the encircling cowl for said core engine, said secondary airstream serving as the supply source for said cooling air.

4. The invention as defined in claim 1 wherein the volume of ambient cooling air discharged through said eductor amounts to between 10 and 15 percent of the volume of the exhaust gas passing from said power turbines during normal operating conditions.

* * * * *